Sept. 15, 1953 F. C. WILLIAMS ET AL 2,652,554
MAGNETIC STORAGE SYSTEM FOR ELECTRONIC
BINARY DIGITAL COMPUTERS
Filed Feb. 27, 1950 3 Sheets-Sheet 1

F. C. Williams
J. C. West
Inventors.
By Moore and Hall
Attorneys

Inventors
F.C. Williams
J.C. West
By Moore and Hall
Attorneys

Sept. 15, 1953 F. C. WILLIAMS ET AL 2,652,554

MAGNETIC STORAGE SYSTEM FOR ELECTRONIC BINARY DIGITAL COMPUTERS

Filed Feb. 27, 1950 3 Sheets-Sheet 3

F.C. Williams
J. C. West
*Inventors*

By [signature]
*Attorneys*

Patented Sept. 15, 1953

2,652,554

UNITED STATES PATENT OFFICE 2,652,554

MAGNETIC STORAGE SYSTEM FOR ELECTRONIC BINARY DIGITAL COMPUTERS

Frederic C. Williams, Timperley, and John C. West, Hindley, England, assignors to National Research Development Corporation, London, England, a British corporation Application February 27, 1950, Serial No. 146,445
In Great Britain March 1, 1949

10 Claims. (Cl. 340—174)

Figure 1:
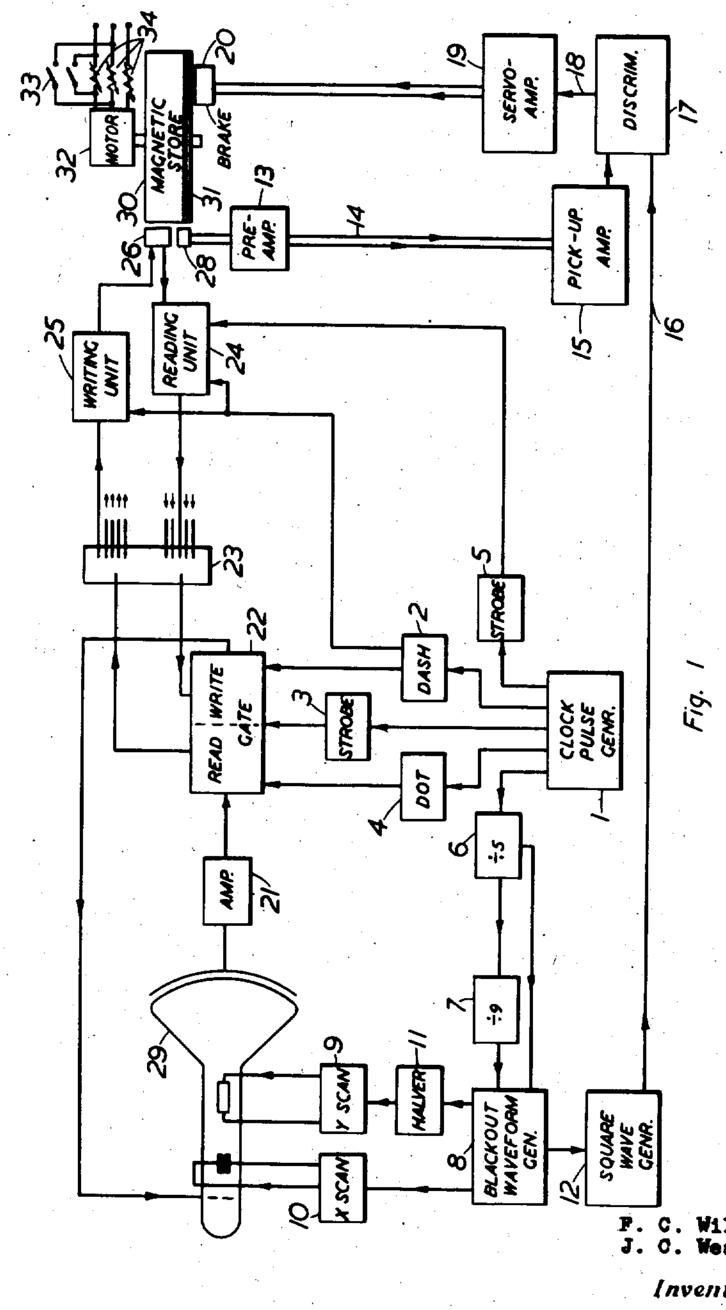

This invention relates to electronic binary-digital computers of the kind which employ storage systems in which may be recorded, during the operation of the machine, the numerical data forming the substance of the computation being performed, and also coded instructions which control the operation of the computing machine.

One example of a machine of the type referred to, which is described in copending U. S. patent application by F. C. Williams et al., Ser. No. 141,176, filed January 30, 1950, employs, to store digital information in the form of binary numbers, conditions of electrostatic charge in one of two states upon discrete areas of cathode ray tube screens and operates in the series mode, i. e. in such a manner that signals representing the digits of the given binary numbers occur in dynamic form as a train of pulse signals in one of two states, the value of each pulse depending upon its position in the train. In contradistinction a machine operating in the so-called parallel mode employs pulse signals occurring simultaneously in separate channels to represent any given number, the value of each pulse signal depending upon the channel it is present in. The present invention is not restricted, however, to such machines employing C. R. T. storage systems but is concerned with computing machines in which any storage system of a temporary nature is employed. Such storage systems, other than C. R. T. storage systems, may, for example, operate by the recording of digital pulse signals as travelling wave pulses in supersonic delay lines or by the storage of digital information as the conditions of two-state devices such as electrical relays or electronic trigger circuits.

All these storage systems are essentially temporary in character. Information may be written into the stores and retained therein while the store and its associated circuits and computing elements are operating but if the system is shut down then the stored information is lost. In the operation of computing machines it is a disadvantage to have all stored information lost at the end of a solution of a problem or at the end of a run of operation of the machine as some of the stored information, particularly instructions, may be required for use in the solution of subsequent problems. The facility of retaining stored information indefinitely is of particular value when the information relates to instructions, as the designing and setting-up of coded instructions is the most laborious and time-consuming operation involved in the employment of universal electronic digital computing machines. Sequences of instructions, once designed, may be applicable to many problems of differing kinds or to repeated problems of the same kind. The provision of such permanent storage would enable data and instructions, initially set-up in the temporary storage system, to be transferred to the permanent storage system and retained for subsequent use. Conversely, data and instructions may originally be supplied to the permanent store from which it may be transferred to the temporary stores when required. A permanent store would also enable tables of functions and similar data to be recorded for use in the machine when required.

In computing machines operating in the series mode in which each signal representing a digit is arranged to occupy a particular one of a continuous succession of equal digit intervals so that the machine operates in a set fundamental rhythm generally synchronised by a constant frequency master oscillator, hereafter called a clock pulse generator, it is essential that the transfer of data to and from the permanent store is accurately synchronised with the operation of the rest of the machine as the real value of a pulse signal is determined by its state and temporal position.

One common form of permanent storage system for use in such computing machines operates by recording the signals representative of binary numbers as conditions of magnetisation of a magnetic recording medium. Such a magnetic storage system may be of the type described in copending U. S. patent application by F. C. Williams, Ser. No. 146,446, filed February 27, 1950, in which each digital signal is stored as the condition of magnetisation along a discrete length of track on a magnetic recording medium, the condition of magnetisation of each such discrete length including, at an intermediate point, an abrupt reversal of the state of magnetisation in a sense characteristic of the significance of the digital signal.

The use of a magnetic storage medium essentially implies relative mechanical movement of the recording medium and a recording or reproducing element, whereas the type of temporary storage considered for use in universal digital computing machines does not normally involve mechanical movement as a basis for distinguishing between signals. When employing a magnetic store in conjunction with a temporary store of any of the types referred to, it is thus essential that the relative movement of the recording medium of the magnetic store should be synchronized with the set rhythmic operation of the temporary store.

It is also highly desirable that the store is capable of storing many times the quantity of digital information than can be stored in each temporary store in order to warrant the additional complication of providing two different kinds of storage system in one computing machine. In a typical machine employing C. R. T. S. as temporary stores the storage capacity of each C. R. T. storage unit is 1,280 digits and as it is convenient to arrange that the contents of each storage unit can be stored in a single circumferential track on the curved surface of a rotatable magnetic recording drum or wheel, each digit signal will be required to be recorded in a length of 0.01 inch for a drum diameter of about 10 inches. As the digit interval in such computing machines is about 10 micro-seconds the drum will have to rotate at about 2000 R. P. M. and the periphery of the drum will be required at all times to be within 0.001 ins. or 0.01 degrees of arc of its correct position which implies a very high degree of synchronisation.

It is therefore an object of the invention to provide in a digital computing machine comprising a temporary and magnetic storage system, means for synchronising the speed of operation of the magnetic store with the set rhythmic operation of the temporary store and the basic digit signal repetition in the computing machine so that digital signals may be recorded upon, or reproduced from, the magnetic store in step with the recording or reproduction of digital signals in the temporary storage system.

Various possible methods exist for the speed control of the magnetic storage system, for example, the moving element of the magnetic recording drum may be in the form of a high accuracy rotor such as that of a phonic wheel where the actual drive of the motor is controlled by an oscillator, but this arrangement is incapable of maintaining the rotation of the drum with the required precision due to phase variations. The moving element may also be driven by a D. C. motor which is speed controlled in conventional fashion by operating on its field. Such a D. C. velocity-controlled servo system is the velodyne but the use of such a system for the present application is not satisfactory due to intermittent effects produced by the brushes which exclude the possibility of a sufficiently constant drive. An alternative method is to use an A. C. servo system comprising a two-phase induction motor which is speed controlled by varying the voltage of one phase by means of an A. C. control loop. Such a system requires the employment of phase-sensitive rectifiers and smoothing networks in the control circuit which are not desirable in the system being considered. It is desirable in fact for the drive mechanisms to be isolated from all external controlling influences.

The present invention contemplates the use of a system in which the recording drum is driven by a motor capable of rotating it at a speed in excess of the required speed and in which the recording drum is restrained to rotate at the required speed by an electro-magnetic brake comprising coils energised by a controlling current derived from a source entirely separate from the motor or its power supply. In such a system in order to keep the recording drum rotating at the required speed, the controlling current must vary in accordance with, and in a sense so as to diminish, the time displacement of the train of signals, obtained by a fixed pick-up head from a train of reference signals laid down on the drum in synchronism with the set rhythmic operation of the computing machine with respect to a similar train of signals in synchronism with the set rhythmic operation. This rhythmic operation of the machine is set by a standard frequency stabilised clock pulse generator so that the signals laid down on the drum and the signals with which the pack-up signals are compared are both conveniently derived from the clock pulse generator.

According to the present invention, therefore, in or for an electronic binary-digital computer utilising a temporary storage system and in which the various operations taking place in the machine are synchronised by a clock pulse generator, a magnetic storage system comprises at least one rotatable recording drum, a number of fixed recording heads co-operating with the drum so that when the drum rotates each head scans a circumferential track on which signals representing binary digits can be stored, a motor capable of rotating the recording drum at a speed in excess of a predetermined speed, generating means for deriving a given train of signals from the clock pulse generator, a series of reference signals on one of the circumferential tracks positioned so that when the drum is rotating at the predetermined speed signals induced in the corresponding recording head are in synchronism with the given train of signals, means for producing a control current which varies in accordance with the time displacement of the signals induced in the recording head with respect to the given train of signals, and an electro-magnetic eddy-current brake co-operating with the recording drum and energised by the control current in such a manner that the drum is constrained to rotate at the predetermined speed.

The frequency with which the position of the recording drum is corrected will be equal to the frequency of the given train of signals selected to synchronise the rotation of the drum. In the type of computing machine already discussed in which the temporary store is in the form of a number of C. R. T. stores each of which store 1,280 digits which can be read out of the store in 28 milli-seconds and in which it is convenient to transfer the contents of a store to the magnetic recording drum during one complete revolution it has been found that a drum designed to possess sufficient mechanical robustness and inertia can be restrained to rotate at the required speed with the necessary steadiness when it is synchronised at the order of 50 times a revolution. In such a machine there is readily available, a voltage having a waveform which has a repetition frequency 64 times the frequency of rotation of the drum and according to a feature of the invention this voltage waveform, which is used to set the time taken to scan one line on a C. R. T. storage screen, is used to produce the train of reference signals on the recording drum and synchronise the operation of the magnetic store with the rest of the machine.

The nature of the invention will be more clearly understood from the following particular description of a computing machine which utilises temporary storage of the C. R. T. type previously referred to such as that described in the aforesaid copending U. S. patent application Ser. No. 141,176, together with a magnetic storage system, The description is given with reference to the accompanying drawings in which—

Figure 4:
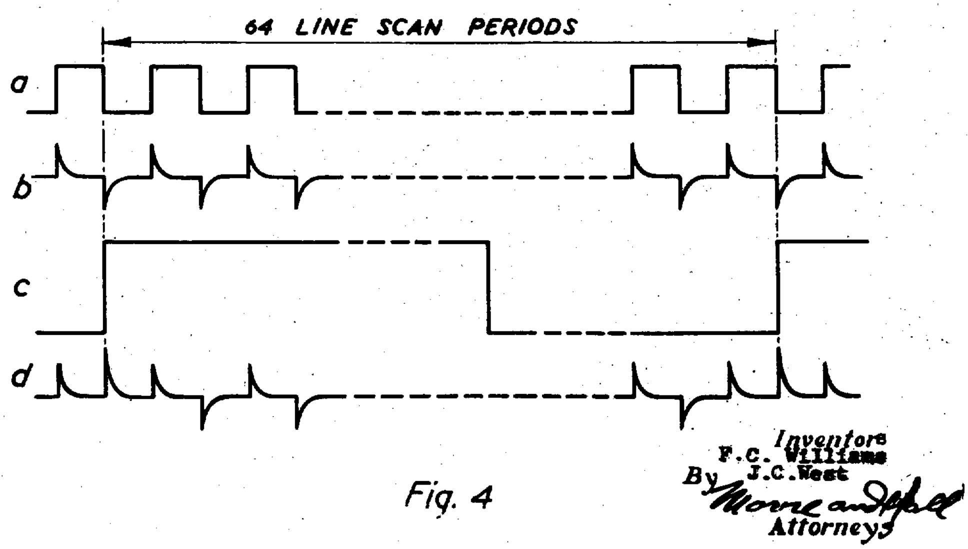

Figure 1 shows in a schematic form part of the circuit arrangements of a computing machine including a C. R. T. store and a magnetic store, Figure 2 shows various waveforms occurring in different parts of the circuits shown in Figures 1 and 3, Figure 3 shows in greater detail part of the circuit arrangements shown in Figure 1 involved in synchronising the operation of the magnetic store with the operation of the rest of the machine; while Figure 4 shows various waveforms in alternative circuit arrangements for synchronising the magnetic store.

The computing machine, shown schematically in Figure 1, will be described as operating in the series mode, each digit in any dynamically occurring number being represented during an allotted time interval previously referred to as the digit interval, by a corresponding pulse signal. The time intervals corresponding to all the digits in any one number are contiguous and in the preferred method (which is considered here) a digit significant of "1" is represented by a pulse, referred to as a dash pulse, which occurs within the time interval while a digit significant of "0" is represented by the absence of a dash pulse in the relevant time interval, or digit interval as it may be referred to. In the machine now being described the digit interval is of 10 microseconds duration and a dash pulse is 6 microseconds long and commences at the beginning of the corresponding digit interval. The digit intervals are of fixed duration and represent the fundamental rhythm of operation of the machine. This basic rhythm is set by a 100 ksc./sec. crystal-controlled oscillator, known as the clock pulse generator 1, producing a square wave output re-occurring every 10 micro-sec. from which the various dynamic and recorded signals occurring in the operation of the computing machine are derived in synchronous relationship with one another. These signals include the dash waveform generated by the dash wave generator 2, a strobe pulse waveform generated by the strobe pulse generator 3, and also a dot pulse waveform generated by the dot pulse generator 4, which are required for the operation of the C. R. T. storage system in a manner described in the aforesaid U. S. patent application Ser. No. 141,176. In the C. R. T. storage system, a single cathode ray tube store 29 being shown in Figure 1, each group of digits representing a single number or coded instruction is normally recorded upon a single line of the C. R. T. screen and each interval of time required for the scanning of a single line, either for the purpose of recording or reproducing in dynamic form a single number, is thus separated from similar adjacent time intervals by fly-back or black-out periods of fixed duration. The fly-back periods will be defined by a corresponding sequence of black-out pulses.

These black-out pulses are produced by the black-out waveform generator 8 from the clock pulse generator 1 in the following manner. The clock pulses are differentiated and their leading edges, in the form of triggering pulses re-occurring at 10 micro-sec. intervals as shown in Figure 2(*a*) are used to trigger a phantastron circuit 6 as described in the copending U. S. patent application No. 762,375 by F. C. Williams, filed July 21, 1947, and now Patent No. 2,549,874, dated April 24, 1951, which is adjusted so that it produces a triggering pulse output coincident with every fifth input pulse as shown in Figure 2(*b*). This output consisting of a train of triggering pulses re-occurring at 50 micro-sec. intervals is used to trigger a second phantastron circuit 7 which is adjusted to produce a trigger pulse coincident with every ninth input pulse as shown in Figure 2(*c*).

Figure 2:
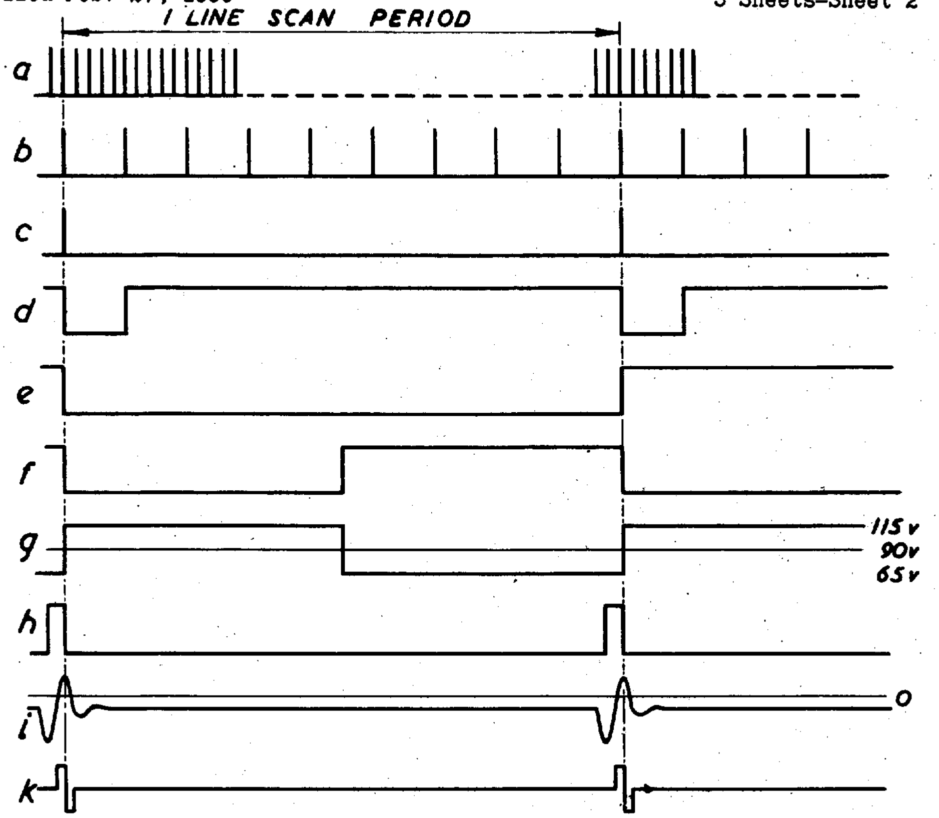
Figure 3:
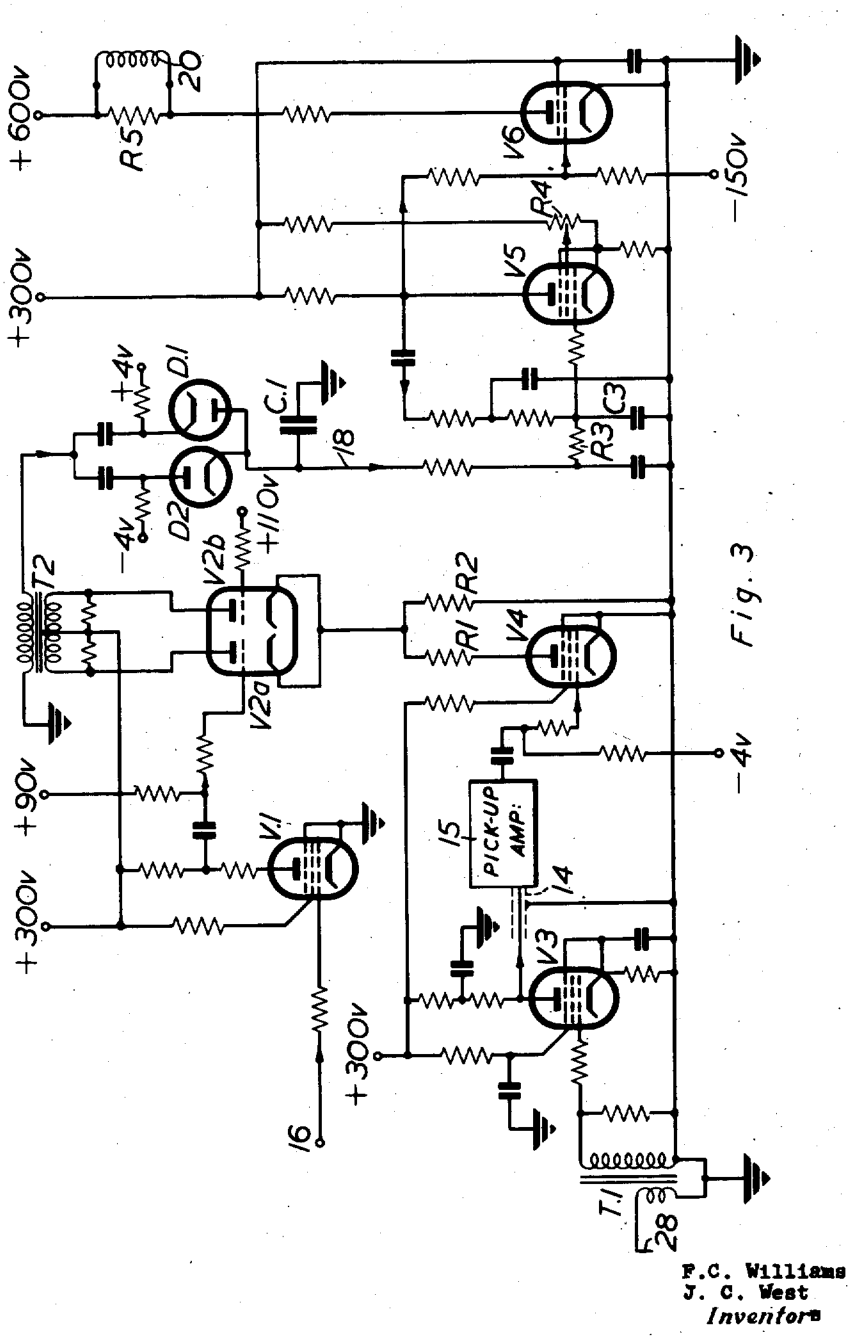

The two trains of trigger pulses shown in Figures 2(*b*) and 2(*c*) are fed into a black-out waveform generator 8 which is arranged to produce an output voltage which is repetitively at one value for 50 micro-sec. and a different value for 400 micro-sec. as shown in Figure 2(*d*). This may be conveniently carried out by using the outputs of the phantastron circuits 6 and 7 to condition a controlled multivibrator or flip-flop circuits. The voltage waveform shown in Figure 2(*b*) is applied from the phantastron circuit 6 so that each trigger pulse sets the multivibrator into a first state which is maintained until the inception of a pulse from the phantastron circuit 7, which may be applied to a coincidence gate to inhibit the action of the coinciding pulse from the circuit 6, triggers the multivibrator into a second state which is similarly maintained until the next pulse is received from the phantastron circuit 6.

The output from the black-out waveform generator 8 as shown in Figure 2(*d*) is used to control the scanning of the C. R. T. storage screen by the electron beam. As shown in Figure 1 the scanning operation of the C. R. T. 29, which is one of many similarly controlled C. R. T. S. in a computing machine is controlled by the X-scan generator 10 which is fed with the black-out voltage waveform and generates a conventional saw-tooth time-base voltage waveform.

As explained in the aforesaid U. S. A. patent application Ser. No. 141,176 previously referred to, only alternate line scanning periods which are called action periods are employed for the recording or reproduction of data in the main C. R. T. storage system. During the intervening periods, or scan periods, regeneration of single lines of stored data occurs. In the typical C. R. T. storage system being described 32 lines of information are recorded on each cathode-ray tube in the store and therefore the entire information recorded in each unit may be recorded or reproduced in the time interval occupied by 64 lines scanning periods.

As shown in Figure 1, the black-out waveform generator 8 controls a halver waveform generator 11, which is a controlled multivibrator or flip-flop circuit producing the halver waveform shown in Figure 2(*e*) and which determines the action and scan periods of the machine. This generator 11 in turn controls the Y-scan generator 9 fully described in copending U. S. A. patent application Ser. No. 93,612 by F. C. Williams et al. filed May 16, 1949, which generates a Y-scan voltage waveform which causes the electron beam to alternately scan a selected line during an action line scanning period and another line for regeneration during scan periods. The black-out waveform is also used to inhibit the application of the dot, dash and strobe waveforms to the read and write gates during the black-out period. These circuits and the connection of the C. R. T. 29 in a regenerative loop including an amplifier 21 and read and write gates 22 are more fully described in copending U. S. patent application Ser. No. 50,136 by F. C. Williams et al. filed September 20, 1948, and the aforesaid copending U. S. patent application Ser. No. 141,176. These circuits are also described in the Proceedings of the Electrical Engineers Part III No. 40, March 1949 on pages 81–100 in a paper entiled "A storage system for use with binary digital computing machines" by Dr. F. C. Williams and Dr. T. Kilburn.

It will thus been seen that the clock pulse generator 1, especially through the black-out waveform generator 8, controls the fundamental rhythm of the temporary storage part of the machine. The arrangement by which the clock pulse generator 1 times the transfer of pulse signals to and from the magnetic store 30 will now be described in outline with reference to Figure 1.

The magnetic store 30 comprises a nickel-plated layer on a brass drum which is rotated at constant speed by an electric motor 32 and which co-operates with a magnetic recording (writing) and reproducing (reading) head 26. The head 26 will normally consist of a number of recording and reproducing heads arranged in line side by side across the drum so that each pair of recording and reproducing heads can record on or reproduce from a particular one of a number of circumferential signal tracks laid round the curved surface of the drum. The head is connected to a writing unit 25 and a reading unit 24 which feed pulse signals to, and receive pulse signals from the read and write gate 22 of the C. R. T. temporary store 29 selected by the tree circuits 23. The manner in which the pulse signals are rendered into a form suitable for recording on the magnetic recording drum and the manner in which such signals are stored on and read out from the drum and rendered in a form suitable from transmission to the rest of the machine is fully described in the aforesaid copending U. S. patent application Ser. No. 146,446, and it will only be pointed out here that the clock pulse generator 1 is used to control the dash waveform generator 2 and the strobe waveform generator 5 which furnish voltages essential to the operation of the reading unit 24 and the writing unit 25.

It now remains to describe with reference to Figure 1 the arrangement by which the clock pulse generator 1 is used to control the speed of rotation of the magnetic recording drum so that a particular pulse signal, when recorded on the magnetic recording drum, is capable of being selectively reproduced for use in the computing machine. This requirement that the rotation of the drum shall be at all times accurately in synchronism with the basic rhythm of the computing machine is carried out by arranging that the rotation of the drum is synchronised by a signal derived directly or indirectly from the clock pulse generator 1. In the practical example being considered here it is arranged that one circumferential track on the magnetic recording drum stores all the data in the form of pulse signals which can be stored in one C. R. T. store and which can be reproduced during one complete scan of all the lines of the C. R. T. As each C. R. T. records on 32 lines the recording drum is thus required, allowing for the alternation of reading (action) and regeneration (scanning) of single lines, to make one complete rotation in the time occupied by 64 line scan periods. For the machine being considered here the line scan period is 450 micro-seconds which is set by the black-out waveform generator 8 and represents the time taken to scan 40 digits (each digit taking 10 micro-seconds to be scanned), plus 50 micro-seconds fly-back or black-out time. Thus as 64 line scan periods take 28.8 milli-seconds a speed of rotation of approximately 2080 R. P. M. is implied. For a drum diameter of approximately 12'' each inch of the circumference of the recording track therefore corresponds approximately to 80 digit intervals. It is thus apparent that accurate selection by a strobe pulse of the transient pick-up voltages from the reproducing head requires a high accuracy of timing of the reproduced signals and a very high degree of synchronisation of the rotation of the recording drum to the basic digit recurrence of the computing machine.

This required degree of synchronisation is obtained by an automatic speed control of the recording drum controlled by the misalignment between signals derived from the drum and line-repetition-frequency signals derived from the basic black-out waveform in the computing machine.

As illustrated schematically in Figure 1 the synchronising system involves the use upon the magnetic recording drum 30 of one circumferential track 31, co-operating with the pick-up head 28 and which may be, but is preferably not, employed for the storage of ordinary digital data. The track has stored upon it a train of 64 pulses corresponding to the leading edges of the black-out pulses of the C. R. T. storage system, as shown in Figure 2(*c*) thus enabling the position of the recording drum to be synchronised 64 times during each revolution. These pulses are recorded as simple very short lengths of uniform longitudinal magnetisation as shown in Fig. 2(*h*), the intervals of track between the pulses may be unmagnetised but are preferably magnetised in the opposite longitudinal direction. Each pulse has a duration of approximately 10 micro-seconds or one digit interval and is separated from the adjacent pulses by intervals of 440 micro-seconds or 44 digit intervals. The induction motor 32 which rotates the drum is fed from a three-phase source via adjustable resistances 34, two of which may be cut out by a switch 33 for starting purposes. The motor is set to provide an excess torque which is balanced by an electro-magnetic brake 20 operating upon the drum. The pick-up head 28 produces a transient pulse as shown in Figure 2(*i*) for each recorded pulse as it passes, and the transient pulses are amplified by the pre-amplifier 13, passed along the leads 14 to be further amplified by the pick-up amplifier unit 15 and fed to a time discriminator unit 17. The discriminator unit 17 is also fed with the output 16 shown in Figure 2(*f*) of the square wave generator 12 derived from the black-out pulse waveform from the C. R. T. storage system and this square pulse wave, re-occurring 64 times each C. R. T. store is completely scanned, is compared in time by the discriminator circuit 17 with the positive peaks of the 64 transient pulses as shown in Figure 2(*i*) derived from each magnetically recorded pulse each time the drum revolves once. The unit 11 produces an error signal which is representative of a time disalignment between the black-out square wave pulses from the computer and the positive peaks of the transient pulse signals reproduced from the magnetic recording drum. This smoothed D. C. error signal is fed along lead 18 and is amplified in a servo-amplifier 19 which provides a control current used to energise the coil of the magnetic brake 20.

When, therefore, the drum 30 has been run up by the induction motor 32 to synchronous speed by operation of the controlling switch 33 and variable resistances 34, a control current will be fed to the brake coil 20 which holds the drum speed accurately at such a value that constant phase relationship is maintained between the black-out square wave pulses from the C. R. T. storage system and the signals reproduced from the recorded pulse signals. Such a rigid phase relationship will be then maintained automatically so long as the driving motor torque does not fall to such a value that a negative braking effect is required.

In practice the recording drum is brought into synchronism by observation of the synchronising pulses obtained from the pick-up head 28 relative to the black-out square wave pulses on a monitor C. R. T. while the drum speed of rotation is being increased. As soon as there is no movement between the patterns the braking power is applied and the synchronised pulses manoeuvred onto a balanced edge of the black-out square wave by finger pressure.

It will thus be seen that the system enables the operation of the magnetic store to be synchronised with the operation of the rest of the machine but the accuracy of the system described is largely dependent upon the accuracy of positioning of the recorded pulses upon the magnetic drum. In order to record these pulses with a sufficient degree of accuracy a process of successive approximation is employed to write a synchronising track initially on a wheel or drum when it has no timing control. The procedure is as follows. The drum is first held stationary and a condenser is discharged through the pick-up head of the synchronising track, the current surge through the head producing a discontinuity in the configuration of the magnetic material which induces a pulse once a revolution in the pick-up head on rotation of the drum. This pulse is then viewed in a monitoring C. R. T. relative to a counter waveform that already exists in the machine and which is derived from the halver waveform shown in Figure 2(*e*), generated by the halver flip-flop 8, by a series of six divisions in frequency by two in a chain of flip-flops.

The pulse is thus viewed relative to a waveform which changes abruptly once for each complete scanning of the C. R. T. stores so that when the two waveforms are stationary relative to one another the wheel is rotating at the correct speed. The synchronising track is now saturated with a small permanent magnet in one direction and 64 pulses of current as shown in Figure 2(*h*), each 10 micro-seconds and separated by 440 micro-seconds are passed through the pick-up head 28, so as to saturate the track in the opposite direction. These pulses will have a certain amount of individual position error but they may be used to provide 64 pulses which approximate to the differential of the flux distribution in the pick-up head as shown in Figure 2(*i*). Employing these pulses in turn it is possible to control the synchronisation of the drum while a further set of 64 pulses is recorded. The errors in the position of the second set of pulses will be considerably reduced with respect to the first set and they may be used to produce a final set of synchronising reference signals or as an intermediate step in the production of the final set of synchronising reference signals.

The synchronising circuits will now be described in greater detail with reference to Figures 2 and 3. Figure 3 shows the circuits and interconnections of the pre-amplifier 13, the discriminator 17 and the servo-amplifier 19 of Figure 1.

The pre-amplifier 13 consists of a valve V3, mounted near to the magnetic recording drum 30 and supplied with signals from the pick-up head 28 through the transformer T1. The amplified output from the valve V3 is passed along the coaxial line 14 to the pick-up amplifier 15 which is a conventional multi-stage amplifier having a band width which need not exceed 500 kc./s. as the maximum frequency component of the synchronising pulse is 100 kc./s. The output from the amplifier is conveniently fed through a cathode follower valve and is of the form shown in Figure 2(*i*).

The fine position discriminator 17 comprising the circuits associated with valves V1, V2*a* and V2*b*, and V4 in Figure 3, compares the position of the synchronising pulses in Figure 2(*i*) with the output 16 of the square wave generator 12, shown in Figure 2(*f*). The reason that this output shown in Figure 2(*f*) is employed instead of direct output from the black-out waveform shown in Figure 2(*d*) is that the unwanted abrupt changes in voltage level between each 450 micro-second synchronising instance occur 225 micro-seconds away from these instances instead of 50 micro-seconds so that danger of false synchronisation on these edges is reduced.

The waveform 16 shown in Figure 2(*f*) then, is fed through the valve V1 and applied to the grid of the valve V2*a* about a mean voltage level of 90 v. as shown in Figure 2(*g*). The grid of valve V2*b* is maintained at a steady potential of +110 v. Each of these common connected cathode valves V2*a* and V2*b* will therefore be operative for equal and alternate periods of time. The cathode load of these valves is provided by a resistance R2 of 100 kilohms and a valve V4 having an anode load resistance R1 of 10 kilohms. The pick-up signal shown in Figure 2(*i*) is applied to the grid of valve V4 which is biassed to −4 v. with respect to the cathode so that the applied waveform to the grid is displaced below earth potential as shown in Figure 2(*i*). The valve V4 thus conducts for only a short period of time at the top of each positive peak which is arranged to be of the order of 8 micro-seconds.

When the valve V4 is turned on the cathode current in the pair of valves V2*a* and V2*b* is increased ten times and this increased current will flow through the side of the pair, the grid of which is the more positive at the instant of turn on. The direction of the current flowing in the primary and the secondary winding of the anode transformer T2 will therefore also depend upon which grid is the most positive. The secondary winding is connected through two D. C. isolating condensers and biassed diodes D1 and D2 to a reservoir condenser C1 having a capacity of 0.05 micro-farad. A positive polarity of current assumed to be a flow of current from earth through the secondary winding will charge the condenser C1 negatively through diode D2. A negative flow current will charge the condenser C1 positively through diode D1. If the current flow in the pair of valves V2*a* and V2*b* is split into two sections of opposite polarity through the two valves then the condenser C1 will be charged proportional to the relative sizes of the two sections. The circuit will thus provide along the line 18 a D. C.

voltage proportional to the displacement of the pick-up pulse. When the positive peak is evenly balanced about the change-over instance as shown in Figure 2(*i*), the charging of the condenser C1 is as shown in Figure 2(*k*) and there will be no resultant D. C. control voltage passed along the line 18.

This error signal is fed into the servo-amplifier and is applied to the stabilising network which is centred on the virtual earth simulated on the grid of the feed-back valve V5. The voltage is fed through an input resistor and smoothed by the 0.005 microfarad condenser C3 and the 220 kilohm resistor R3. Integral and time-derivative control is supplied by the anode to grid feed-back loop. The anode voltage of valve V5 is restored to a suitable level by the D. C. coupling and applied to the grid of the current amplifying valve V6. The level of the anode voltage signal of valve V6 is controlled by adjusting the screen potential of valve V5 by means of the variable resistor R4 and is conveniently carried out when the grid of the valve V6 is earthed. The anode load of valve V6 is a 15 kilohm resistor R5 across which the eddy-current braking coils 20 arranged to form a load of one kilohm are taken.

Four pairs of iron-cored relay coils each of 2000 ohms, are arranged equally spaced near the outer edge around a circular face of the recording drum. Each pair of coils is connected in series so that the adjacent core faces have opposite polarity. The top of each pair of coils is connected by a strip of iron and the magnetic circuit is completed by the flux which flows between the two pole pieces in proximity to the surface of the recording drum. The driving motor has a synchronous speed of 3000 R. P. M. and so a steady current of about 40 milliamps is found to be required to brake the drum to the correct speed.

The action of the synchronising circuits just described may be suppressed, for example during the writing of data onto the recording drum, by the application of a negative voltage to the suppressor grid of valve V4 (after disconnecting it from its cathode) and which is sufficiently large to cut off the valve. The reservoir condenser C1 will then remain unaffected and retain its charge until this has leaked away through the resistive arm feeding the servo-amplifier. This negative voltage may be obtained from the write control unit 8 described in copending patent application No. 5,632/49 with reference to Figures 1 and 6, in order to prevent writing signals in adjacent recording heads affecting the pick-up signal. It should be noted in this connection that because a drum will continue rotating in synchronism for periods as long as one whole revolution after the suppression of synchronising signals reoccurring 64 times a revolution, it does not follow that a drum can be synchronised to the required accuracy solely by synchronising signals reoccurring once per revolution.

The system that has now been described, while being satisfactory as a means of maintaining the necessary synchronism when once this has been set up is not provided with an overall or coarse control of the relative phase position of the recording drum with respect to the complete cycle of 64 line scan periods so that there are 64 possible positions in which the recording drum may be orientated with respect to the raster. If the correct orientation were to be achieved after the recording drum was synchronised with the individual line scan periods, it would most conveniently be carried out by injecting the required number of pulses into the timing circuits of the C. R. T. scanning raster, each injected pulse causing a unit displacement between the recording drum and the raster.

A preferable method which avoids the inconvenience of a power supply failure involves the provision of a complementary servo-system to provide an overall or coarse control which may be produced by superimposing upon the fine automatic phase control already described a coarse control based upon misalignment between signals which occur only once for each revolution of the recording drum.

In a modified synchronising system which performs this coarse control, the fine control is effected, not by use of the black-out square wave, but by the use of a halver waveform produced by the halver flip-flop 11 and which is a rectangular waveform shown in Figure 2(*e*) and having a frequency equal to half the line scan frequency of the C. R. T. storage system. This halver waveform is also shown in Figure 4(*a*), and will have 32 positive going and 32 negative going edges during 64 line scan periods corresponding to one complete rotation of the magnetic storage drum. This waveform is employed as a recording current wave in the magnetic store so that reproduced signals obtained subsequently will be the differential of the wave as indicated in Figure 4(*b*).

The machine also produces, by a series of five successive frequency divisions by two from the halver wave (in order to control the line-selection mechanism as explained in the aforesaid copending U. S. patent application Ser. No. 93,612 a rectangular waveform having a frequency equal to $\frac{1}{64}$ of the line scan repetition frequency as indicated at Figure 4(*c*), this wave having one positive going edge during each rotation of the magnetic drum, this edge coinciding with one negative going edge of the halver wave. This rectangular voltage waveform is adjusted to be of greater magnitude than the halver waveform so that when it is superimposed upon the halver waveform for recording it converts one negative pulse of the wave of Figure 4(*b*) at the beginning of every 64 line scan period to a positive pulse as indicated in Figure 4(*d*) which thus represents the output now obtained from the reproducing head. In order to make use of this reproduced synchronising wave the pick-up amplifier 15 of Figure 1 feeds a gate circuit which is arranged to respond to the occurrence of the second of two consecutive positive pulses. This output pulse is fed to a time discriminator circuit similar to but separate from the circuit of unit 17 of Figure 1 and is compared therein in time with the positive going edge of the wave Figure 4(*c*) to provide a D. C. error signal to be converted into a coarse control current by a servo-amplifier for feeding a magnetic brake, similar to but separate from the magnetic brake 20. The positive pulses in the output of the pick-up amplifier are of course all fed to the time discriminator circuit 17 where they are compared with the original halver wave shown in Figure 4(*a*) to provide a control current acting via the magnetic brake 20 in the manner already described to produce a fine control. Alternatively a common servo amplifier and brake may be employed for both the coarse and fine controls; an automatically operating changeover device being provided to disconnect the coarse time discriminator from the amplifier and to replace it with the fine discriminator when the output from the coarse discriminator falls below a given value.

In the description given above only a description with reference to Figure 1 has been given of the function of the interconnections existing between a single magnetic store and a single C. R. T. high speed store. In Figure 1, the tree circuit 23 has been used to indicate some of the possible connections to a single C. R. T. store that are necessary in order that the computing machine may perform its desired functions. The nature of such interconnections depends solely upon the operations which it is desired the computer should perform and the routing and switching and selecting circuits which must be provided will be obvious to those versed in the art and will be generally of the character described in the aforesaid copending U. S. patent application Ser. No. 141,176. Only one magnetic storage drum has been described as employed for the storage of information on a number of circumferential tracks which may be utilised selectively.

Alternatively a number of recording drums may be employed, one drum and associated recording and reproducing head being provided for each group of information to be recorded on a separate track. For the purposes of synchronous running it will be most convenient if all the drums can be mounted on a common shaft and driven from a single motor and synchronising system. However, there is an optimum size for the rotating system which can be conveniently synchronised and when the rotating elements exceed this size it is preferable to provide separate driving and synchronising systems for each drum.

It will be apparent that the magnetic storage system, unlike the cathode-ray-tube system described in the various patent specifications previously referred to, has a long access time. In the C. R. T. storage system in particular, a number may be selected for reproduction or a number written into any selected address in the store with a time delay equal to one line scan period only, in the magnetic storage system no such line selection is possible and in order to read a particular number or digit it is necessary to wait until the appropriate portion of the recording track passes under the recording and reproducing head. This difficulty prevents the magnetic storage system being utilized effectively in the high speed operations of the computor but does not prevent the use of the magnetic system for the storage of information which is not frequently required in a random fashion during the operation of the computor.

The system described is operated in the series mode but the magnetic storage elements may obviously be adapted for use in a computor operating in the parallel mode. In such a computor one magnetic storage track will be required for each digit of any number or coded instruction which is to be ultilised in the machine and the writing or reading operations will be performed simultaneously on all the tracks of the storage system. Each storage track may obviously have recorded thereon a number of digits, a single track recording for example, the $n$th digits of a large number of different numbers or coded instructions.

We claim:

1. In an electronic binary-digital computer utilising a temporary storage system and in which the various operations taking place in the machine are synchronised by a clock-pulse generator, a magnetic storage system comprising at least one rotatable drum, a number of fixed recording heads cooperating with the drum so that when the drum rotates each head scans a circumferential track on which signals representing binary numbers can be stored, a motor capable of rotating the drum at a speed in excess of a predetermined speed, generating means for deriving a given train of signals from said clock pulse generator, said signals being of a form in which an abrupt change of amplitude in a given direction takes place at regular intervals embracing a fixed number of digit signals, a series of reference signals on one of said circumferential tracks positioned so that when the drum is rotating at said predetermined speed signals induced in the corresponding recording head are in synchronism with said given train of signals, means for comparing the phase of said signals induced in said recording head by said reference signals with the phase of said abrupt change of amplitude in the waveform in said given direction of said given train of signals, means for deriving a control current which varies in accordance with the phase displacement between said reference signals and said given train of signals, and braking means responsive to said control current and cooperating with the recording drum to constrain said drum to rotate at said predetermined speed and in synchronism with said given train of signals.

2. An electronic binary-digital computer comprising a temporary store in the form of at least one cathode-ray tube which stores on its screen binary numbers as conditions of electrostatic charge along a number of lines which are arranged to form a raster, a clock-pulse generator, a black-out waveform generator synchronized by said clock-pulse generator and generating a voltage having a waveform reoccurring every line scan period and used to control the cathode-ray tube electron beam so that it scans one line of the raster in a said line scan period, a magnetic storage system comprising at least one rotatable recording drum, a plurality of fixed recording heads cooperating with said drum so that when the drum rotates each head scans a circumferential track on which signals representing binary numbers can be stored, a motor capable of rotating the recording drum at a speed in excess of a predetermined speed at which the drum rotates once while the electron beam completely scans a cathode-ray tube raster, means for producing a train of short duration timing signals from the black-out waveform generator and reoccurring at said line scan period intervals, said timing signals being fed to a recording head to produce a series of reference signals on one of the circumferential tracks positioned so that when the drum is rotating at said predetermined speed signals induced in the corresponding recording head are in synchronism with said timing signals, means for deriving a given train of signals from said clock pulse generator said signals being of a form in which an abrupt change of amplitude in a given direction takes place at said line scan period intervals, means for comparing the phase of said signals induced in said recording head by said reference signals with the phase of said abrupt change of amplitude in said given direction in the waveform of said given trains of signals, means for deriving a control current which varies in accordance with the phase displacement between said reference signals and said given train of signals, and braking means responsive to said control current and cooperating with the recording drum to constrain said drum to rotate at said predetermined speed and in synchronism with said given train of signals.

3. An electronic binary-digital computer comprising a temporary store in the form of at least one cathode-ray tube which stores on its screen binary numbers as conditions of electrostatic charge along a number of lines which are arranged to form a raster, a clock-pulse generator, a black-out waveform generator synchronised by said clock-pulse generator and generating a voltage having a waveform reoccurring every line scan period and used to control the cathode-ray tube electron beam so that it scans one line of the raster in a said line scan period, a magnetic storage system comprising at least one rotatable recording drum, a plurality of fixed recording heads cooperating with said drum so that when the drum rotates each head scans a circumferential track on which signals representing binary numbers can be stored, a motor capable of rotating the recording drum at a speed in excess of a predetermined speed at which the drum rotates once while the electron beam completely scans a cathode-ray tube raster, means for producing a train of short duration timing signals from the black-out waveform generator and reoccurring at said line scan period intervals, said timing signals being fed to a recording head to produce a series of reference signals on one of the circumferential tracks positioned so that when the drum is rotating at said predetermined speed signals induced in the corresponding recording head are in synchronism with said timing signals, a square-wave generator synchronised by said clock-pulse generator and generating a voltage having a waveform in which an abrupt change of amplitude in a given direction occurs at intervals of one line scan period and coincident with the start of each such period, followed after an interval corresponding to one half said period by a similar abrupt change of amplitude but in the opposite direction, means for comparing the phase of said signals induced in said recording head by said reference signals with the phase of said abrupt amplitude change in said given direction of said square-wave generator output voltage, means for deriving a control current which varies in accordance with the phase displacement between said reference signals and said square-wave generator output voltage, and braking means responsive to said control current and cooperating with the recording drum to constrain said drum to rotate at said predetermined speed and in synchronism with said abrupt changes in the given direction of said square-wave generator output voltage.

4. An electronic binary-digital computer according to claim 3 in which said means for comparing the phase of the signals induced in said recording head by the reference signals with the phase of the abrupt change of amplitude in the given direction in the waveform of said square-wave generator output voltage comprises a pair of thermionic valves each having at least a cathode, a control grid and an anode, said anodes being connected in push-pull to the primary winding of an output transformer, a gating valve also having at least a cathode, a control grid and an anode, and having its anode-to-cathode path connected in series with the common cathode return lead of said pair of valves, means for normally biassing the control grid of said gating valve to anode current cut-off, means for applying the signals induced in the recording head by said reference signals to the control grid of said gating valve to render said valve conductive at the instants of occurrence of said reference signals, means for applying said square-wave generator output voltage to the control grid of one of said pair of valves, means for normally biassing the control grids of said pair of valves so that the application of said square-wave generator output voltage tends to cause anode current to flow alternately in each valve for one half line scan periods, the turning on of one valve and the turning off of the other valve coinciding with said abrupt change in amplitude in the given direction of said square-wave generator output voltage, means for applying the signals induced in the secondary winding of said output transformer to a pair of unilaterally-conducting devices connected back-to-back to provide a D. C. potential which represents the algebraic sum of the output of said devices, a condenser, a circuit means for applying said D. C. potential to said condenser, whereby said condenser is charged to a potential which corresponds in magnitude and sign to the relative phase displacement between the signals induced in said recording head by said reference signals and the abrupt change of amplitude in the given direction in the waveform of said square-wave generator output voltage.

5. An electronic binary-digital computer according to claim 4 in combination with means for deriving a control current comprising a first thermionic valve having at least a cathode, a control grid and an anode, circuit means for applying the potential across said condenser to the control grid of said valve, a load resistance in series with the anode of said valve, a negative-feedback network connected between anode and control grid of said valve, and a second thermionic valve having at least a cathode, a control grid and an anode, a D. C. coupling between the anode of said first valve and the control grid of said second valve and circuit means for applying the anode current of said second valve to said braking means.

6. An electronic binary-digital computer according to claim 5 in which said braking means comprise an electro-magnetic eddy-current brake cooperating with the recording drum.

7. For an electronic binary digital computer in which the numbers utilised therein are signalled by electric pulses occurring during specific time intervals and which includes a master clock pulse generator for defining each of said specific pulse time intervals, a magnetic storage system comprising at least one rotatable drum, a peripheral magnetic recording surface on said drum defining at least one endless circumferential number storage track on which signals representing binary number digits can be stored and at least one further endless circumferential marker storage track on which position-marking signals related to the signal recording positions on said number recording track can be stored, first recording and reproducing head means for said number storage track, second reproducing head means for said marker storage track, a driving motor connected to rotate said drum, said motor being arranged to be capable of rotating the drum at a speed in excess of a predetermined speed at which number signals derived from said number storage track through said first reproducing head means synchronise with the predetermined pulse time intervals defined by said clock pulse generator, electrically controlled braking means effective directly on said drum, the extent of the braking force being variable in accordance with variation of a controlling current supplied to said braking means, generating means for deriving a train of time marking signals from said clock pulse generator, said signals being of a form similar to that of said position-marking signals and having a repetition frequency and phase which synchronises with such position marking signals when the drum is rotating at the required speed and with the required phase relationship to the associated computer, means for comparing the phase of said time-marking signals with the phase of said position-marking signals, means for deriving a control current which varies in accordance with the degree of phase displacement between said compared signals and means for supplying said control current to said braking means.

8. For an electronic binary digital computer in which the numbers utilised therein are signalled by electric pulses occurring during specific time intervals and which includes a master clock pulse generator for defining each of said specific pulse time intervals, a magnetic storage system comprising at least one rotatable drum, a peripheral magnetic recording surface on said drum defining at least one endless circumferential number storage track on which signals representing binary number digits can be stored and at least one further endless circumferential marker storage track on which position marking signals related to the signal recording positions on said number recording track can be stored, first recording and reproducing head means for said number storage track, second recording and reproducing head means for said marker signal storage track, an electric driving motor connected to rotate said drum, said motor being arranged to be capable of rotating the drum at a speed in excess of a predetermined speed at which number signals derived from said number storage track through said first recording and reproducing head means synchronise with the predetermined pulse time intervals defined by said clock pulse generator, electro-magnetic braking means effective directly on said drum, the extent of the braking force being variable in accordance with variation of a controlling current supplied to said braking means, generating means for deriving a train of time-marking signals from said clock pulse generator, said signals being of a form in which an abrupt change of amplitude takes place at regular intervals which coincide with similar abrupt changes in said position marking signals when the drum is properly synchronised, means for comparing the phase relationship of said abrupt changes of said time-marking signals with respect to the abrupt changes of said position marking signals, means for deriving a control current which varies in accordance with the degree of phase displacement between said compared signals and means for supplying said control current to said electro-magnetic braking means.

9. For an electronic binary digital computing machine in which the numbers involved are signalled in the series mode by means of electric pulse signal trains each comprising a predetermined number of sequential digit indicating time intervals and which includes a master clock pulse generator for defining each of said sequential digit indicating time intervals, a magnetic number storage system comprising at least one rotatable drum having a peripheral magnetic recording surface defining a plurality of endless circumferential number recording tracks on which signals representing a plurality of binary numbers can be stored and at least one further endless circumferential recording track on which position marking signals can be stored, recording and reproducing head means for each of said number recording tracks, a reproducing head for said further recording track, a driving motor connected to drive said drum, said motor being capable of rotating the drum at a speed in excess of a predetermined speed at which signals reproduced from any one of said number recording tracks synchronise with the digit time-intervals defined by said clock pulse generator, electrically controlled braking means operative directly on said drum with a braking power which is variable in accordance with the strength of a control current supplied thereto, generating means for deriving a train of timing signals from said clock pulse generator, said timing signals being of a form which provides an abrupt change of amplitude at an instant which marks the end of each group of said predetermined number of sequential digit time intervals of said clock pulse generator, a series of reference signals in said further recording track, said reference signals being positioned so that the reference signals derived therefrom provide abrupt changes of amplitude which synchronise with the abrupt changes of said timing signals when the drum is rotating in such a manner that the number signals derived from any one of said number recording tracks are synchronised with the pulse signal trains in the associated computing machine, phase-comparing means supplied with said timing signals and said reference signals, said phase comparing means providing an output control current which varies above and below a given level in accordance with the phase lead and phase lag of said abrupt changes of said reference signals relative to said abrupt changes of said timing signals and means for applying said derived control current to said braking means.

10. For an electronic binary digital computer which operates in the serial mode and in which number and instruction words are signalled therein by means of electric pulse signal trains occurring in specific beat time-intervals each comprising a predetermined number of sequential digit indicating time-intervals and which includes a master clock pulse generator for defining each of said sequential digit indicating time-intervals and has frequency dividing means for providing further timing signals defining each of said beat intervals, a magnetic storage system comprising at least one rotatable drum having a peripheral magnetic recording surface defining at least one endless circumferential recording track on which an integral number of groups of signals each representing a number word or an instruction word can be stored thereon and at least one further endless circumferential reference signal recording track carrying a plurality of position marking signals, one for each of said word indicating groups of said other recording track, an electric driving motor connected to drive said drum, said driving motor being energised to an extent sufficient to drive said drum at a speed faster than that at which word signals reproduced from said drum will occur in synchronism with the beat time intervals of said computer, electro-magnetic braking means effective directly on said drum, said braking means being capable of providing a braking force which is variable in accordance with the strength of an applied control current, phase comparing means supplied with signals derived from said reference signal recording track and with said beat-interval defining signals, said phase comparing means providing an output control current which varies above and below a predetermined value in accordance with phase lead or phase lag of the applied reference signals with respect to the applied beat interval signals and means for supplying said control current to said electromagnetic braking means.

FREDERIC C. WILLIAMS.
JOHN C. WEST.

References Cited in the file of this patent

UNITED STATES PATENTS

| Number | Name | Date |
|---|---|---|
| 2,334,510 | Roberts | Nov. 16, 1943 |
| 2,395,517 | Stoller | Feb. 26, 1946 |
| 2,403,921 | Hallborg et al. | July 16, 1946 |
| 2,538,065 | Wallace | Jan. 16, 1951 |